US00RE34337E

United States Patent [19]

Bennett

[11] E Patent Number: Re. 34,337

[45] Reissued Date of Patent: Aug. 10, 1993

[54] BEVERAGE DISPENSER WITH AUTOMATIC CUP-FILLING CONTROL AND METHOD FOR BEVERAGE DISPENSING

[75] Inventor: Clay Bennett, Payson, Ariz.

[73] Assignee: IMI Cornelius Inc., Anoka, Minn.

[21] Appl. No.: 308,863

[22] Filed: Feb. 9, 1989

Related U.S. Patent Documents

Reissue of:

[64] Patent No.: 4,641,692
Issued: Feb. 10, 1987
Appl. No.: 743,568
Filed: Jun. 11, 1985

[51] Int. Cl.[5] ..... B65B 3/04

[52] U.S. Cl. ..... 141/95; 141/198; 141/1; 307/118; 307/247.1

[58] Field of Search ..... 141/1, 95, 94, 96, 83, 141/192, 198, 360, 361, 362; 73/290 R, 304 R, 294; 137/390, 392; 307/118, 247.1

[56] References Cited

U.S. PATENT DOCUMENTS

| | | | |
|---|---|---|---|
| Re. 26,828 | 3/1970 | Atkins et al. . | |
| 175,980 | 4/1876 | Hildebrand . | |
| 563,464 | 7/1896 | Fahrney . | |
| 585,264 | 6/1897 | Fahrney . | |
| 1,149,256 | 8/1915 | Godfrey . | |
| 1,520,560 | 12/1924 | Burno . | |
| 1,562,971 | 11/1925 | Kershaw et al. . | |
| 1,585,500 | 5/1926 | Kershaw et al. . | |
| 1,690,066 | 10/1928 | Holland . | |
| 2,081,650 | 5/1937 | Tamminga et al. . | |
| 2,081,651 | 5/1937 | Tamminga et al. . | |
| 2,321,844 | 6/1943 | Nicholson . | |
| 2,377,796 | 6/1945 | McKinnis . | |
| 2,385,161 | 9/1945 | Pinkerton . | |
| 2,390,443 | 12/1945 | McKinnis . | |
| 2,413,020 | 12/1946 | Wolfner . | |
| 2,426,252 | 8/1947 | Thomson . | |
| 2,426,707 | 9/1947 | Pollson et al. . | |
| 2,455,681 | 12/1948 | Kantor et al. . | |
| 2,502,578 | 4/1950 | McDaniel . | |
| 2,523,363 | 9/1950 | Gehman . | |
| 2,529,796 | 11/1950 | Cade . | |
| 2,617,510 | 11/1952 | Little . | |
| 2,639,078 | 5/1953 | Karlen | 226/127 |
| 2,663,477 | 12/1953 | Bendz . | |
| 2,667,990 | 2/1954 | Mojonnier . | |
| 2,792,566 | 5/1957 | Shanhouse et al. . | |
| 2,792,920 | 5/1957 | Sutphen et al. . | |
| 2,863,472 | 12/1958 | Coles et al. . | |
| 2,880,910 | 4/1959 | Hanson et al. . | |
| 2,887,036 | 5/1959 | Voglesonger et al. . | |
| 2,898,954 | 8/1959 | Freeman . | |
| 2,900,894 | 8/1959 | Tritt . | |
| 2,919,726 | 1/1960 | Zimmermann et al. . | |
| 2,925,101 | 2/1960 | Dunham . | |
| 2,932,315 | 4/1960 | Jarzembski . | |
| 2,938,551 | 5/1960 | Hallstein | 141/227 |
| 3,009,606 | 11/1961 | Zimmermann et al. . | |
| 3,060,835 | 10/1962 | Eads et al. . | |
| 3,069,671 | 12/1962 | Taylor . | |
| 3,077,203 | 2/1963 | Wolsh . | |
| 3,131,335 | 4/1964 | Berglund et al. . | |
| 3,145,741 | 8/1964 | Smith . | |
| 3,165,099 | 8/1964 | Severino et al. . | |
| 3,170,479 | 2/1965 | Mueller . | |
| 3,179,035 | 4/1965 | Lockett . | |
| 3,200,997 | 8/1965 | Creswick . | |
| 3,206,615 | 9/1965 | La Pointe . | |
| 3,224,638 | 12/1965 | Harrell, Jr. . | |

(List continued on next page.)

*Primary Examiner*—Ernest G. Cusick
*Attorney, Agent, or Firm*—Sten Erik Hakanson

[57] ABSTRACT

An automatic cup-filling control arrangement for beverage dispensers utilizes the spray or mist of liquid droplets, formed by flowing beverage striking beverage already in the cup, to complete an electrical circuit. This electrical circuit extends from an electrically conducting member, such as an actuating lever, to beverage flowing through a dispensing valve. When the mist of droplets permits a pre-established magnitude of current to flow between the actuating lever and the flowing beverage, which occurs when beverage in the cup reaches a pre-determined level, dispensing of the beverage is terminated.

20 Claims, 3 Drawing Sheets

U.S. PATENT DOCUMENTS

| | | | |
|---|---|---|---|
| 3,229,668 | 1/1966 | Koinzan . | |
| 3,246,180 | 4/1966 | Keeney, Jr. . | |
| 3,248,011 | 4/1966 | Brodsky . | |
| 3,252,420 | 5/1966 | Sorensen . | |
| 3,254,333 | 5/1966 | Raumoel . | |
| 3,279,379 | 10/1966 | Klyce . | |
| 3,282,020 | 11/1966 | Smith . | |
| 3,282,467 | 11/1966 | Immermann et al. . | |
| 3,291,149 | 12/1966 | Atkins et al. | 137/392 |
| 3,297,844 | 1/1967 | Eisendrath et al. . | |
| 3,300,690 | 1/1967 | Taraba . | |
| 3,335,334 | 8/1967 | Albisser . | |
| 3,339,578 | 9/1967 | Smith . | |
| 3,340,892 | 9/1967 | Holland . | |
| 3,357,339 | 12/1967 | Schaab | 99/283 |
| 3,357,461 | 12/1967 | Friendship | 141/6 |
| 3,368,404 | 2/1968 | King . | |
| 3,374,325 | 3/1968 | Eisendrath . | |
| 3,374,326 | 3/1968 | Eisendrath . | |
| 3,391,547 | 7/1968 | Kingston . | |
| 3,392,349 | 7/1968 | Bartley . | |
| 3,430,667 | 3/1969 | Hughes . | |
| 3,437,108 | 4/1969 | Sorenson . | |
| 3,443,608 | 5/1969 | Copping et al. . | |
| 3,445,039 | 5/1969 | Brodsky et al. . | |
| 3,448,778 | 6/1969 | Ramsay . | |
| 3,461,352 | 8/1969 | Worland . | |
| 3,465,587 | 9/1969 | Pierce . | |
| 3,465,588 | 9/1969 | Slavin . | |
| 3,465,668 | 9/1969 | Boscarino . | |
| 3,477,460 | 11/1969 | Dotto . | |
| 3,486,660 | 12/1969 | Heintz . | |
| 3,495,131 | 3/1970 | Rickey . | |
| 3,504,205 | 3/1970 | Sheckler . | |
| 3,519,769 | 7/1970 | Grimes . | |
| 3,520,445 | 7/1970 | Hansen . | |
| 3,520,638 | 7/1970 | McUmber et al. . | |
| 3,521,791 | 7/1970 | Freise et al. . | |
| 3,580,158 | 5/1971 | Scholle . | |
| 3,584,643 | 6/1971 | Burke . | |
| 3,595,281 | 7/1971 | Laub, III . | |
| 3,598,287 | 8/1971 | de Man . | |
| 3,616,824 | 11/1971 | Orlando . | |
| 3,623,053 | 11/1971 | Meyer . | |
| 3,626,400 | 12/1971 | Bates . | |
| 3,638,392 | 2/1972 | Welker, Jr. et al. . | |
| 3,651,991 | 3/1972 | Ohlson et al. . | |
| 3,669,315 | 10/1972 | Upton . | |
| 3,670,765 | 6/1972 | Haynes . | |
| 3,671,780 | 6/1972 | Lefferts . | |
| 3,673,952 | 7/1972 | Durbin . | |
| 3,695,314 | 10/1972 | Watts et al. . | |
| 3,696,362 | 10/1972 | Sieron . | |
| 3,704,724 | 12/1972 | Holbrook et al. . | |
| 3,734,123 | 5/1973 | Pomerantz . | |
| 3,781,840 | 12/1973 | Roberts et al. . | |
| 3,785,526 | 1/1974 | Shinn . | |
| 3,800,826 | 4/1974 | McCann . | |
| 3,839,645 | 10/1974 | Nickerson . | |
| 3,868,664 | 2/1975 | Hill . | |
| 3,894,240 | 7/1975 | Rose . | |
| 3,916,963 | 11/1975 | McIntosh | 141/198 |
| 3,987,502 | 10/1976 | Hartmann . | |
| 3,991,911 | 11/1976 | Shannon et al. . | |
| 4,027,172 | 5/1977 | Hamelink . | |
| 4,040,457 | 8/1977 | Niese et al. . | |
| 4,107,472 | 8/1978 | Kawanami et al. . | |
| 4,165,186 | 8/1979 | Tortorich et al. . | |
| 4,186,849 | 2/1980 | Spangler . | |
| 4,195,374 | 4/1980 | Morris et al. . | |
| 4,202,387 | 5/1980 | Upton . | |
| 4,203,099 | 5/1980 | Edwards . | |
| 4,213,339 | 7/1980 | Shannon . | |
| 4,236,553 | 12/1980 | Reichenberger | 141/198 |
| 4,259,982 | 4/1981 | Bartels . | |
| 4,261,397 | 4/1981 | Guy . | |
| 4,263,587 | 4/1981 | John . | |
| 4,289,980 | 9/1981 | McLaughlin . | |
| 4,324,268 | 4/1982 | Jacobson . | |
| 4,353,482 | 10/1982 | Tomlinson et al. . | |
| 4,356,480 | 10/1982 | Dressler . | |
| 4,367,462 | 1/1983 | Dressler . | |
| 4,437,497 | 3/1984 | Enander . | |
| 4,440,200 | 4/1984 | De Vale et al. | 141/95 |
| 4,446,896 | 5/1984 | Campagna . | |
| 4,458,735 | 7/1984 | Houman | 141/95 |
| 4,469,150 | 9/1984 | Grimaldi . | |
| 4,559,979 | 12/1985 | Koblasz et al. | 141/95 X |
| 4,572,253 | 2/1986 | Farmer et al. | 141/95 |
| 4,712,591 | 12/1987 | McCann et al. | 141/95 X |
| 4,738,285 | 4/1988 | Belland | 141/1 |
| 4,753,277 | 6/1988 | Holcomb et al. | 141/95 |

FOREIGN PATENT DOCUMENTS

| | | |
|---|---|---|
| 1206609 | 12/1965 | Fed. Rep. of Germany . |
| 2234105 | 2/1973 | Fed. Rep. of Germany . |
| 1388755 | 7/1965 | France . |
| 295506 | 3/1954 | Switzerland . |
| 153916 | 8/1963 | U.S.S.R. . |
| 819448 | 9/1959 | United Kingdom . |

11
19
15
79
23
77
24
101
113
93
109
107
71
21
13
69
85
83
81
87
17

117
127
119
131
15
45
C2
129
13
R4
D1
R5
R1
R2
C3
C1
133
R6
121
R3
Q1
R7
R8
10
11
139
141
8
9
12
13
3
14
135
137
4
7
1
2
5
6
C4
R11
R9
R10
123
+V
125
+V
C5
145
143
113
93

BEVERAGE DISPENSER WITH AUTOMATIC CUP-FILLING CONTROL AND METHOD FOR BEVERAGE DISPENSING

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to beverage dispensers, and more specifically, this invention relates to a *method of and a* beverage controlling the filling of a cup to a pre-determined level.

2. Description of the Prior Art

The dispensing of beverages into a cup for immediate consumption is a long-established art. In the earlier forms of dispensers, the beverage to be consumed was discharged into a cup or other receptacle under manual control. Such an approach requires an operator to institute dispensing and to terminate dispensing. This system is acceptable in some environments, such as a soda fountain or a concession stand, but even in such environments it requires the operator to spend the time required to observe the filling of the cup. Also, there is frequently considerable spillage, and the portions of beverage will inevitably vary.

Most beverage dispensing involves the mixing of a flavor concentrate with a suitable diluent, such as soda water or plain water. There are two basic approaches to mixing the concentrate and diluent. The first is the pre-mix approach (i.e., the concentrate and diluent are mixed prior to dispensing), while this other is the post-mix approach (i.e., the concentrate and diluent are mixed during dispensing). With the advent of automatic vending machines, the need for an automatic portion control was immediately obvious. Some early beverage dispensers carried over the manual control aspect, but the problems of spillage (including deliberate wasting) and greatly variable size of portions required as automatic portion control.

The automatic portion controls that were developed, and which are still in use today, employ a measuring of the amount of pre-mixed beverage (in the pre-mix application) or the amount of concentrate and diluent (in the post-mix application) that are discharged. While this system has been generally satisfactory, there are still some problems that make automatic filling control based upon the actual product in the cup, rather than the amount of beverage to be discharged, highly desirable. Attempts to provide portion control based upon beverage in the cup, such as a weight measuring system, have not been very satisfactory.

While there may be some cases in which the portion control of current dispensers is based upon the actual volume of beverage to be discharged, most beverage dispensers now utilize solenoid valves. Accordingly, the measurement of beverage to be discharged is generally based upon actuating the solenoid valve for a given amount of time. The time is calculated to permit the valve to discharge the desired amount of beverage. However, the time calculation is based upon a given rate of flow, which assumes a given orifice size. During usage, the beverage (particularly the concentrate in a post-mix system) may well accumulate to decrease the effective orifice size, thus reducing the rate of flow and resulting in a discharge of less beverage than desired. In the case of a post-mix apparatus, not only may the portion be undesirably small, but since accumulation will normally be more of a problem with the concentrate than the diluent, the resulting beverage may also be weaker than desired.

Another difficulty is that basing portion size upon amount of beverage discharge, even if the portion control is not adversely affected by accumulation of beverage build-up in the valve, is that the dispensed portion is dependent upon the size of the cup. In other words, only a single size of cup may be utilized. However, in many locations, such as, for example, a cafeteria line, it is desirable to be able to dispense beverages in a variety of sizes of cups. Since it is usually not feasible to have a separate dispenser for each size of cup, manually controlled dispensers are still generally employed in such locations. The result, as indicated above, is spillage or waste and variation in the size of the portions. Automatic control based upon the level of liquid in a cup, regardless of the size of the cup, would be most helpful in environments such as this.

SUMMARY OF THE INVENTION

The present invention provides an arrangement for accurately filling a cup with beverage to a pre-determined level, regardless of the size of the cup and based upon the amount of beverage in the cup, rather than the amount of beverage discharged by the dispenser. This highly desirable result is achieved by establishing an electrical circuit through the flowing beverage and a mist or foam of droplets of the beverage that are produced by flowing beverage striking the beverage in the cup. Since the invention works the same for both a pre-mixed or post-mixed beverage, the term beverage, as used herein, will refer not only to a completed mixture of the constituents, but also to the individual constituents singly or in combination.

The present invention will be utilized in connection with a dispenser having one or more sources of beverage, such as relatively large containers, from which a beverage or a selection of beverages may be discharged. Beverage from the containers is conveyed to a valve assembly for discharge controlled by a valve, preferably a solenoid valve. In the case of pre-mixed beverages, there will be a single container and a single solenoid valve for each beverage to be dispensed, while in the case of post-mixed beverages there will be a container of concentrate and a container of diluent, each with its associated solenoid valve, for each beverage to be dispensed. As the operation of the invention is substantially identical for both a pre-mixed beverage apparatus and a post-mixed beverage apparatus, with the exception of the number of solenoids to be energized and the number of valves, the description herein is applicable to both types of systems.

In order to complete an electrical circuit to the beverage flowing through the solenoid valves, advantage is taken of the fact that a continuous metallic path exists between beverage passing through each of the solenoid valves and an outer metallic structure, such as a mounting member or a magnetic shield surrounding the solenoid valves. As a result of this continuous metallic path, electrical current can pass from the outer metallic structure to the flowing beverage. By connecting the outer metallic structure into an electrical circuit, such as by connecting it to one side of a power supply, the flowing beverage may be included as part of the complete electrical circuit.

Energization of the solenoid valves is dependent upon a power switch that is closed to pass power to the solenoid when beverage is to be dispensed. An example of a suitable power switch is a triac connected in series with the solenoid coils.

Control of the triac power switch is achieved through a flip-flop circuit that produces a signal to trigger the triac to a conducting or closed circuit condition when it is desired to energize the solenoid valves to dispense a beverage. Activation of the flip-flop circuit to produce this signal is achieved by means of an actuating lever that energizes a microswitch to trigger the flip-flop circuit. This actuating lever is normally activated by pressing the cup to be filled against the actuating lever, which then initiates dispensing of the beverage. Alternatively, the cup could be placed adjacent a stationary electrically conductive member and initiation of dispensing could be achieved by a different actuating mechanism, such as a push button.

An electrical circuit, which includes the flip-flop circuit, a power supply, the connection from the power supply to the outer metallic structure of the solenoids, and the metallic path from the outer metallic structure to the interior of the valves, interconnects the actuating lever (or other electrically conductive member) and the flowing beverage. As the cup fills with the beverage, a mist or spray of small droplets of the beverage (in the case of a carbonated beverage the droplets are in the form of a foam) increases the amount of moisture between the actuating lever and the stream of beverage. This mist or spray results from the flowing beverage striking the beverage in the cup and causing the droplets to be thrown into the air. In the case of a post-mixed beverage, this spray or mist may include droplets of the constituents as well as the mixed beverage.

As the beverage in the cup reaches a pre-determined level, the density of the mist between the actuating lever and the flowing beverage increases to the point that the impedance between the lever and the beverage is decreased to a value that permits a current flow of a pre-established magnitude to flow. This pre-established magnitude of current will trigger the flip-flop to change states and cause the triac to return to a non-conducting or open circuit condition, thus de-energizing the solenoid valves and terminating the dispensing of the beverage.

If for some reason the cup has not been filled to the desired level, a manual override switch is provided to set the flip-flop circuit to trigger the triac to the closed circuit condition and start the cup-filling sequence over again.

With this arrangement, the pre-determined level to which the cup is to be filled can be selected by adjusting the magnitude of current required to established a triggering of the flip-flop. Thus, the cup will be filled to the pre-determined level regardless of the size of the cup and without depending upon the discharge of a pre-measured quantity of beverage.

*A method of dispensing beverage into a cup with level sensing and respective automatic shut-off of dispensing includes permitting an electrical current to flow to an electrically conductive member outside of and adjacent to the cup.*

These and other objects, advantages and features of this invention will hereinafter appear, and for purposes of illustration, but not of limitation, an exemplary embodiment of the subject invention is shown in the appended drawing.

DETAILED DESCRIPTION OF THE PREFERRED EMBODIMENT

Figures 1, 2:
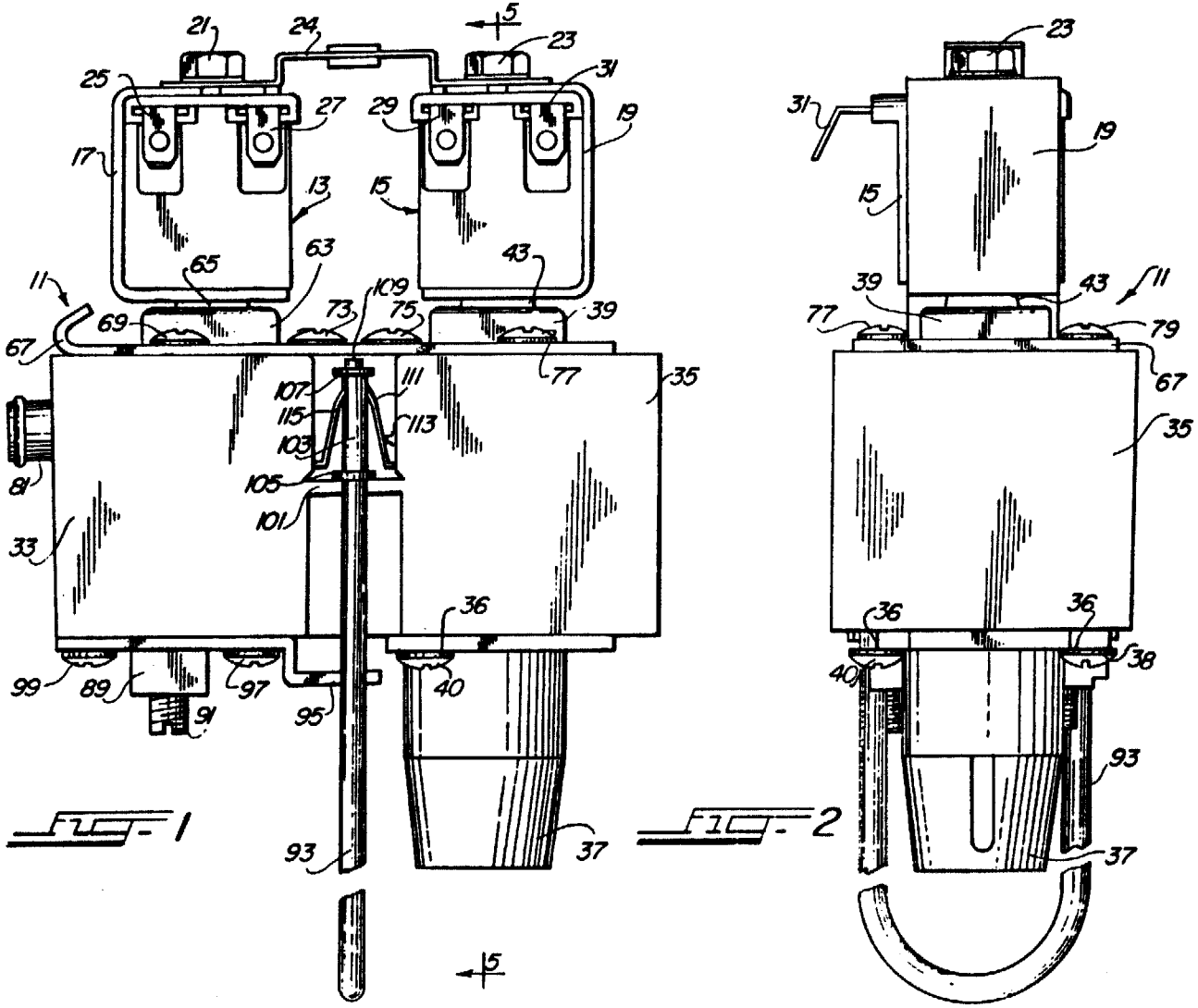
FIG. 1 is a side elevational view of a beverage dispenser valve assembly and dispensing nozzle constructed in accordance with the present invention.
FIG. 2 is a front elevational view of the beverage dispensing valve assembly and dispensing nozzle of FIG. 1.
Figure 3:
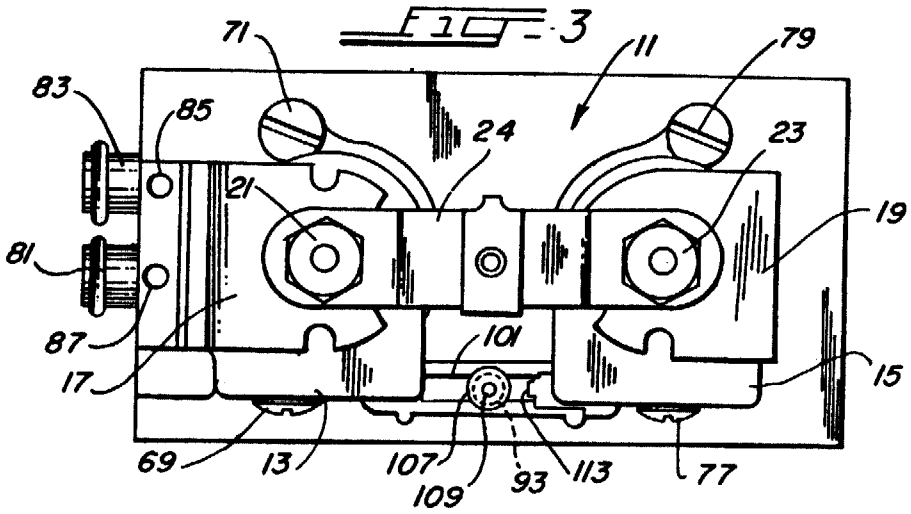
FIG. 3 is a top plan view of the beverage dispenser portion of FIG. 1.

A preferred embodiment of a solenoid valve arrangement, with a dispensing nozzle, for achieving the goals of the present invention is illustrated in FIGS. 1-3 and 5. Although this invention may be utilized equally well with either a pre-mix or a post-mix type of dispenser, the preferred embodiment disclosed herein illustrates the use of the invention in a post-mix apparatus. As indicated above, the term "beverage" will be used in a general sense to refer both to the completed beverage to be consumed and to the individual constituents, such as concentrate and/or diluent.

A solenoid valve structure 11, in this preferred embodiment, includes a pair of solenoid coils 13 and 15. Of course, if a pre-mixed beverage were to be discharged, only a single solenoid coil and the corresponding valve would be utilized. Solenoid coils 13 and 15 are any suitable type of electrically energized coil, various types of which have been utilized in the dispensing field in the past.

Each of the solenoids 13 and 15 is secured to an associated mounting bracket 17 or 19, respectively. Mounting brackets 17 and 19 are formed of any suitable relatively strong metal to adequately support the respective solenoid coils 13 and 15 and to provide a magnetic path about the solenoid structure. Mounting brackets 17 and 19 are secured to their respective solenoids by lock nuts 21 and 23. Brackets 17 and 19 are interconnected by a retaining strip 24 that is secured to the respective frames at each end thereof by the lock nuts 21 and 23.

Electrical energy is supplied to solenoid 13 by means of angle tabs 25 and 27, while electrical energy is supplied to solenoid 15 through similar angle tabs 29 and 31. In this preferred embodiment, the solenoids are AC solenoids energized from a 24 volt source of alternating current, although any suitable electrical power source could be employed with appropriate current modification.

Each of the solenoids 13 and 15 is also mounted on an associated valve body 33 and 35, respectively. Valve body 35 is also provided with an output nozzle 37 that is the dispensing nozzle of the dispenser. Nozzle 37 is secured to valve body 35 by a washer or other retaining member 36 and a pair of attaching devices, such as screws 38 and 40.

A metallic valve housing 39 is secured in valve body 35 with a suitable liquid-tight seal 41. Metallic housing 39 has a generally cylindrical extending portion 43 that fits in the core of solenoid coil 15 to provide a metallic sleeve in which the metallic plunger 45 of solenoid 15 reciprocates. Sleeve 43 is sealed at its upper end by an extending metallic stem 47, to which lock nut 23 is affixed.

Since stem 47 is in intimate contact with sleeve 43, there is a continuous metallic path from stem 47 to housing 30. In addition, metallic plunger 45 rides in sleeve 43 with a relatively close tolerance and is electrically connected to sleeve 43 either by direct contact therewith or by a liquid film therebetween. Thus, an electrical connection to any beverage located in the interior 49 of housing 30 may be made through stem 47.

Plunger 45 is provided with a valve plug 51, which is normally driven into contact with a valve seat 53 by a bias spring 55. Energization of solenoid 15 will move plunger 45 against the bias of spring 55 to remove the valve plug 51 from valve seat 53. This opens the interior 49 of housing 30 to the nozzle 37. Therefore, so long as solenoid 15 is energized, beverage introduced to the interior 49 of housing 39 through a conduit 57 may be passed to nozzle 37 through a conduit 59 for discharge into a suitable cup 61. (The term "cup" is understood to refer to any suitable receptacle for the beverage.)

A similar metallic housing 63 and sleeve 65 is mounted on valve body 33 for the solenoid 13. In the case of a post-mix apparatus as disclosed herein, the solenoid 15 might be used to control the discharge of concentrate, while solenoid 13 might be utilized to control the discharge of a diluent, such as soda water or plain water.

Housings 39 and 63 are secured to valve bodies 33 and 35 by a retaining clip 67. Retaining clip 67 is secured to valve bodies 33 and 35 by suitable attaching devices, such as screws 69, 71, 73, 75, 77 and 79.

Inlet bushings 81 and 83 provide a source of beverage. In this preferred embodiment of a post-mix apparatus, a beverage concentrate and a diluent are inserted through these bushings. Set screws 85 and 87 may be utilized to secure inlet bushings 81 and 83 to valve body 33. A flow control assembly 89 is mounted on valve body 33 and is provided with a set screw 91 for adjustment thereof.

To initiate dispensing, an actuating lever 93 is provided. Actuating lever 93 is illustrated as U-shaped bale in this preferred embodiment, although any suitable shape of size of actuating lever may be utilized. For purposes of this invention, a significant aspect of actuating lever 93 is that it be constructed of an electrically conducting metal. (It may be noted that it would also be possible to place a stationary electrical conducting member adjacent the cup and to initiate dispensing by a different type of actuator, such as a push-button on the dispenser.)

A mounting bracket 95 for actuating lever 93 is mounted on valve body 33 by suitable attaching devices such as screws 97 and 99. Actuating lever 93 is also mounted on a cross arm 101 through a sleeve 103 placed between retaining rings 105 and 107. A reduced diameter portion 109 of actuating lever 93 extends above retaining ring 107.

Actuating lever 93 is mounted for a pivoted motion as the bottom end thereof adjacent nozzle 37 is pushed away from the nozzle 37. This pivoting motion of actuating lever 93 causes sleeve 103 to bear against a flexible spring-type arm 111. As arm 111 is flexed, it bears against a microswitch 113 to initiate dispensing of beverage by the apparatus. A flexible arm 115, similar to arm 111, is located opposite the flexible arm 111.

Figure 4:
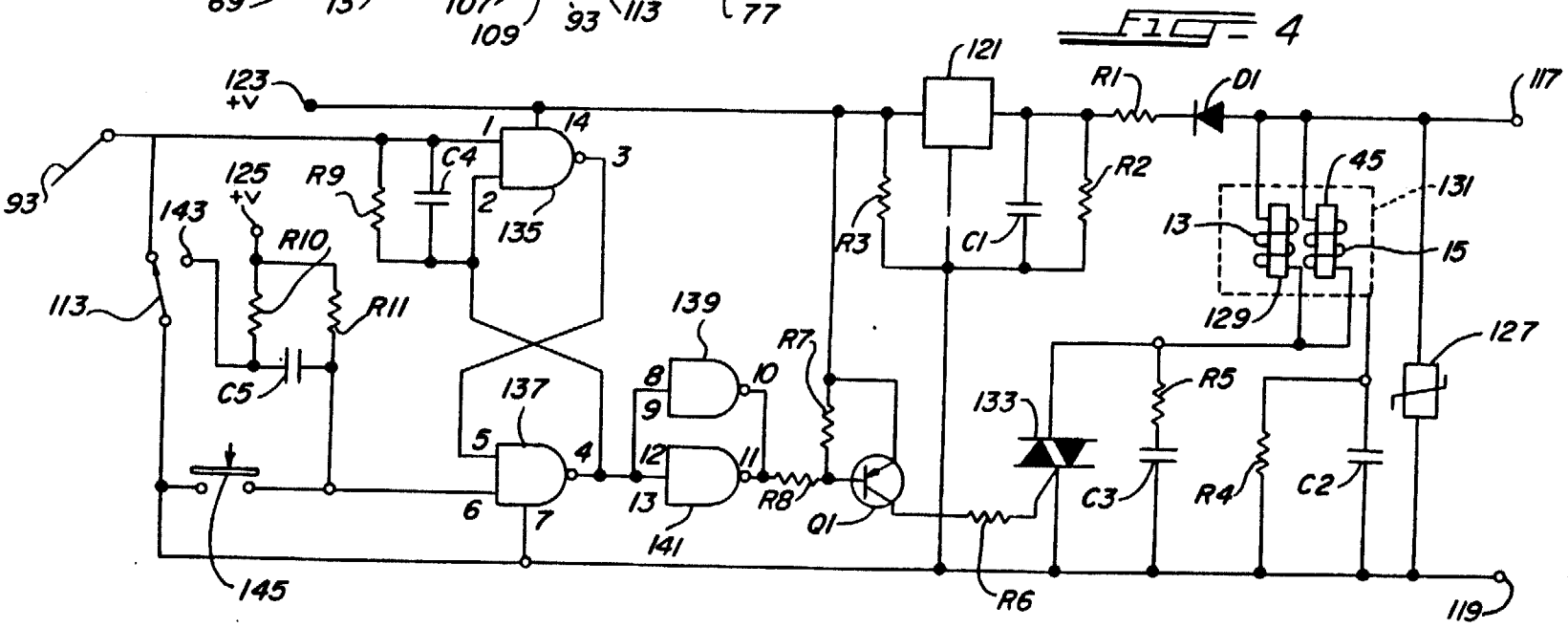
FIG. 4 is a schematic circuit diagram of an automatic fill-control circuit constructed in accordance with the present invention.
Figure 5:
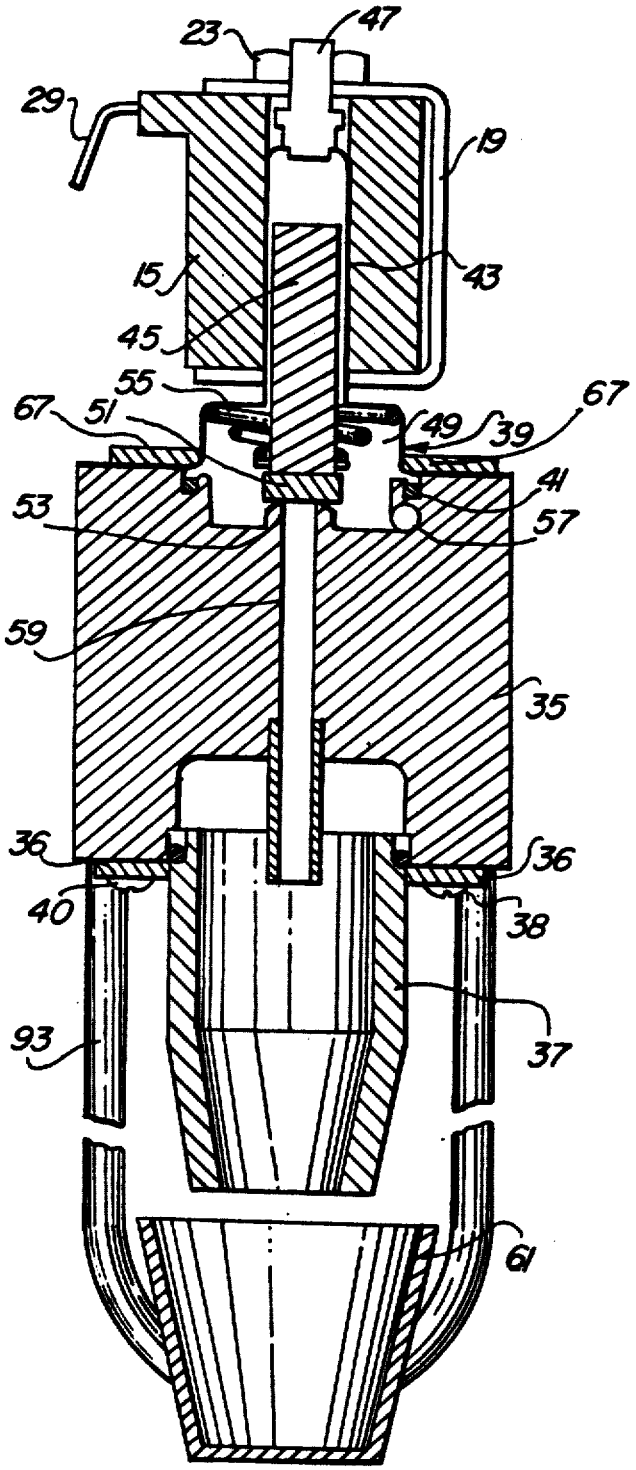
FIG. 5 is a cross-sectional view taken line 5—5 of FIG. 1.

A circuit for achieving the automatic fill control of the present invention is illustrated in FIG. 4. An AC source is connected to terminals 117 and 119, such as a 24 volt AC supply. In the circuit of this preferred embodiment, terminal 119 is the AC or logic ground. When microswitch 113 is in its normal or non-actuated position, actuating lever 93 (shown schematically) is electrically connected to ground through microswitch 113.

The 24 volt AC signal is half-wave rectified by diode D1. The half-wave rectified output of diode D1 is passed to a voltage regulator circuit 121 through a current limiting resistor R1. Voltage regulator 121 provides a 15 volt DC potential to ground (V+) at terminals 123 and 125. A filter capacitor C1 at the input of voltage regulator 121 is connected in parallel with a bleed resistor R2 at the input to voltage regulator 121. Another bleed resistor R3 is connected to ground at the output of voltage regulator 121.

A noise suppressor 127, such as a pair of back-to-back Zener diodes, may be provided at the input across terminals 117 and 119. However, in many applications, this noise suppressor will not be required.

Solenoid coils 13 and 15 are shown schematically, as well as the plunger or armature 45 for coil 15 and a similar armature or plunger 129 for solenoid coil 13. A resistor R4 and a capacitor C2 connect a metallic component or structure 131 of the solenoid structure to logic ground. The metallic structure 131 may be any portion of the solenoid valve structure 11 that provides an electrically conductive path to the beverage in an associated housing, such as housing 39 associated with solenoid coil 15. Thus, in the valve assembly described above, metallic structure 131 could be stem 47. In other solenoid arrangements, a magnetic shield is placed around the solenoids and is connected with a metallic path to the beverage in the valve, and thus such a magnetic shield could serve as the metal component 131. In any event, the necessary aspect is that an electrical connection be made from one side of the supply, in this case the AC ground, to a beverage passing through the valve for dispensing.

Energization of solenoids 13 and 15 is controlled by a power switch, in this preferred embodiment a triac 133 connected between solenoid coils 13 and 15 and ground. A series arrangement of a resistor R5 and a capacitor C3 is connected across the triac to provide a filtering function and to assure turnoff of the triac at the end of the dispensing function.

A control signal, in the form of a gating current, is applied to the gate of triac 133 by a transistor Q1 through a resistor R6. Transistor Q1 has a resistor R7 connected between its emitter and base, and the input signal to the base is supplied through a resistor R8.

The input signal to the base of transistor Q1 is provided b a flip-flop circuit formed by NAND gates 135 and 137. The outputs of the flip-flop circuit is inverted by NAND gates 139 and 141. NAND gates 135, 137, 139 and 141 are located in a standard CMOS chip, which provides a highly sensitive flip-flop circuit that responds to relatively very small changes in current. Pins of the flip-flop circuit chip are indicated by the corresponding numerals 1–14.

A parallel arrangement of a resistor R9 and a capacitor C4 connects one of the inputs of NAND gate 135 to the other input of that NAND gate and to the output of NAND gate 137. One side of this circuit, and one input to NAND gate 135, is also connected directly to the electrical circuit that leads to actuating lever 93.

A resistor R10 and capacitor C5 are connected from the DC potential at terminal 125 to an input of NAND gate 137. The mid-point of resistor R10 and capacitor C5 is connected to the normally open terminal 143 of microswitch 113. Another resistor R11 is connected in parallel across resistor R10 and capacitor C5.

Closing of microswitch 113 by activation of actuating lever 93 provides a set signal through capacitor C5 to the input of NAND gate 137 to initiate dispensing. In the event that the dispensing operation, described hereinafter, does not fill cup 61 to the desired level, a manually actuated switch 145 may be supplied to re-initiate the dispensing operation.

While the components of the circuit of FIG. 4 may be varied to achieve desired results in any particular application, a circuit utilizing the following components has been successfully operated:

| COMPONENT | VALUE OR TYPE |
|---|---|
| R1 | 47 ohm. ¼ watt |
| R2 | 4.7 kohm. ¼ watt |
| R3 | 47 kohm. ¼ watt |
| R4 | 100 kohm. ¼ watt |
| R5 | 100 ohm. ¼ watt |
| R6 | 1 kohm. ¼ watt |
| R7 | 3 kohm. ¼ watt |
| R8 | 3 kohm. ¼ watt |
| R9 | 1 megohm. ¼ watt |
| R10 | 100 kohm. ¼ watt |
| R11 | 100 kohm. ¼ watt |
| C1 | 150 microfarad, 35 volt |
| C2 | .01 microfarad, 100 volt |
| C3 | .01 microfarad, 100 volt |
| C4 | .001 microfarad |
| C5 | .01 microfarad |
| Q1 | 2N 3638 |
| Triac 133 | Q 20C4L3 |
| Voltage Regulator 121 | V39ZA1 |
| NAND Gate Circuit | CD4011 |

When it is desired to dispense beverage to fill a cup to a pre-determined level, actuating lever 93 is activated, such as by pushing it with the cup. This results in microswitch 113 connecting the normally open contact 143 to logic ground. This connects the input 6 (the numbered connections for the NAND gates 135–141 tare the pin connections identified on the CD4011 logic chip) of NAND gate 137 to ground through capacitor C5. This negative going signal causes the output of NAND gate 137 at pin 4 to go to a "1" or positive stage, which is conveyed to pin 2 of NAND gate 135. Since microswitch 113 no longer connects pin 1 of NAND gate 135 to ground, pin 1 also receives the positive output of NAND gate 137 through capacitor C4 and resistor R9, so that the output of NAND gate 135 at pin 3 is a "0" or negative signal. The "0" at pin 3 is connected to pin 5 of NAND gate 137 to hold pin 4 at the "1" output until the circuit is reset.

The output of NAND gate 137 is inverted by NAND gates 139 and 141 and applied to the base of transistor Q1 through resistor R8. This negative going signal triggers transistor Q1, which provides gate current for triac 133 through resistor R6. Triac 133 is thus switched to a closed circuit or conducting state to connect solenoid coils 13 and 15 across terminals 117 and 119 for energization by the AC source. Energization of solenoids 13 and 15 opens the respective valves for discharge of a beverage, such as into cup 61.

As cup 61 fills, a spray or mist of droplets of liquid (which may be the mixed beverage, the individual constituents, or a combination thereof) is formed adjacent the top of the beverage already in the cup. In the case of a carbonated beverage, the spray or mist will be a foam produced by the carbon dioxide and droplets of liquid.

As the cup fills to a pre-determined level, the spray, mist or foam will create an electrically conductive path between the actuating lever 93 and the beverage flowing into cup 61. As the quantity of liquid droplets grows with increase of the beverage level in cup 61, the impedance of the electrically conductive path between actuating lever 93 and the flowing beverage will decrease until a current of a sufficient magnitude can flow to reset the flip-flop circuit. Due to the relatively sensitive nature of the flip-flop circuit utilized, in the preferred embodiment disclosed herein, a current flow on the order of 5 microamperes is sufficient to initiate the reset operation.

The relatively small current flows from the positive output at pin 4 of NAND gate 137, through the resistor R9 to actuating lever 93 and from actuating lever 93 to logic ground through the spray or mist of liquid droplets, the flowing beverage, the metallic path to the metallic structure 131 and capacitor C2. The current flowing through this path to begin charging of capacitor C2 produces a sufficiently negative going potential on pin 1 of NAND gate 135 to change the output of the NAND gate 135 to a "1" or positive signal. Since capacitor C5 has charged to the DC potential on terminal 125 through the resistor R11, both inputs to the NAND gate 137 are positive, so that a "0" or negative signal is produced at the output of NAND gate 137. Thus, the flip-flop circuit formed by NAND gates 135 and 137 is reset, and the "0" or negative pulse on pin 4 at the output of NAND gate 137 is inverted into a positive signal that turns off transistor Q1, which removes the gate current to triac 133. Triac 133 is thus switches to an open circuit or non-conducting state, so that the solenoid coils 13 and 18 are no longer energized and the discharge of beverage is discontinued.

If the cup 61 has not been filled to the desired level, the manual override switch 145 may be closed to connect pin 6 of NAND gate 137 to ground, which produces a negative going pulse that sets the flip-flop formed by NAND gates 135 and 137 back to the state required to initiate dispensing. The cycle of dispensing and turnoff as described above is then reinitiated.

It should be understood that various modifications, changes and variations may be made in the arrangement, operation and details of construction of the elements disclosed herein without departing from the spirit and scope of this invention.

I claim:

1. A beverage dispenser having an arrangement for automatically controlling the filling of a cup, *the cup having a top rim and having an interior volume for holding the beverage, the boundaries of the interior volume defined generally by a cup bottom surface, a cup sidewall surface and a top surface, the top surface having a perimeter defined by the cup rim, the beverage dispenser* comprising:

at least one valve means for controlling discharge of beverage from said *at least one* source into the cup to be filled;

actuating means to cause said *at least one* valve means to be energized to initiate dispensing of the beverage into the cup to be filled;

an electrically conductive member associated with the beverage dispenser and disposed to be positioned adjacent to and outside of the cup that is being filled;

circuit means electrically interconnecting said electrically conductive member and said *at least one* valve means to thereby electrically interconnect said conductive member with beverage flowing through said *at least one* valve means *and the conductive member providing for such current flow wherein no portion thereof extends into the volume of the cup and wherein no portion thereof extends transversely therefrom terminating adjacent to the cup top surface*; and control means for operating said *at least one* valve means in response to a change in impedance between said electrically conductive member and the beverage, when the cup has been filled to a predetermined level, to discontinue beverage flow to the cup.

2. A beverage dispenser as claimed in claim 1 wherein said actuating means and said electrically conductive member are combined in an actuating lever.

3. A beverage dispenser as claimed in claim 2 wherein said actuating lever is activated by pressing the cup to be filled against it.

4. A beverage dispenser as claimed in claim 1 wherein the change in impedance is effected by droplets of beverage, which are produced by flowing beverage striking beverage already in the cup, forming an electrical current path between said electrically conductive member and the beverage.

5. A beverage dispenser as claimed in claim 4 wherein said droplets of beverage are in a foam created during the dispensing of a carbonated beverage.

6. A beverage dispenser as claimed in claim 4 wherein said control means comprises a flip-flop circuit that changes state upon current flow of a pre-established magnitude between the beverage and said electrically conductive member, the change in state of said flip-flop circuit closing said *at least one* valve means to terminate beverage flow to the cup being filled.

7. A beverage dispenser as claimed in claim 1 wherein said [circuit means comprises a continuous metallic path from] *at least one valve means further includes* an outer metallic structure [of said valve means] *and said circuit means further including a continuous metallic path from said outer metallic structure* to beverage passing through said *at least one* valve means to [complete an] *provide for* electrical connection to the beverage.

8. A beverage dispenser as claimed in claim 7 wherein said circuit means further [comprises] *includes* an electrical connection from said metallic structure to *a* logic ground.

9. A beverage dispenser as claimed in claim 1 wherein said *at least one* is a solenoid valve and said control means comprises:

a power switch to pass electrical energy to said solenoid valve when beverage is to be dispensed; and a flip-flop circuit to close said power switch when said solenoid valve is to be energized, said flip-flop circuit changing state to open said power switch in response to said change in impedance between said electrically conductive member and the beverage.

10. A beverage dispenser as claimed in claim 1 wherein a portion of said control means is also a part of said circuit means.

11. A beverage dispenser as claimed in claim 1 [wherein a plurality of beverage sources and associated valves are] *and further including a plurality of valve means each valve means connectable to a separate source of beverage and said plurality of valve means* controlled by said control means.

12. A beverage dispenser as claimed in claim 1 and further comprising a manual override switch to re-initiate dispensing if the cup was not filled to the pre-determined level during the previous dispensing operation.

13. A beverage dispenser having an arrangement for automatically controlling the filling of a cup, *the cup having a top rim and having an interior volume for holding the beverage, the boundaries of the interior volume defined generally by a cup bottom surface, a cup sidewall surface and a top surface, the top surface having a perimeter defined by the cup rim, the beverage dispenser* comprising:

at least one source of beverage;

at least one solenoid valve for controlling discharge of beverage from said *at least one* source into the cup to be filled;

an outer metallic structure associated with said *at least one* solenoid valve, a continuous metallic path existing from said metallic structure to beverage passing through said solenoid valve;

a power supply;

an electrical connection from said metallic structure [one side of] said power supply;

a power switch to pass power to said at least one solenoid valve when beverage is to be dispensed;

an actuating lever to initiate dispensing of beverage;

a flip-flop circuit responsive to said actuating lever to close said power switch when said at least one solenoid valve is to be energized to dispense beverage; and an electrical circuit including said flip-flop circuit, said power supply, said electrical connection, said metallic structure and said metallic path to electrically interconnect said actuating lever and the beverage flowing through said *at least one* valve during dispensing, said circuit being completed for current flow of a pre-established magnitude by droplets of beverage, which are produced by flowing beverage striking beverage in the cup when the cup has been filled to a [pre-determined] level *permitting such pre-established current flow*, the current of said pre-established magnitude changing the state of said flip-flop circuit to open said power switch and de-energize said *at least one* solenoid valve, *and the actuating lever providing for such current flow wherein no portion thereof extends into the volume of the cup and wherein no portion thereof extends transversely therefrom terminating adjacent to the cup top surface.*

14. A beverage dispenser as claimed in claim 13 wherein said electrical connection [comprises] *is connected to a logic ground side of said power supply and wherein said electrical connection further includes* a resistor and a capacitor *connected* in parallel between said metallic structure and said logic ground.

*15. A method for automatically filling a cup, the cup having a top rim and having an interior volume for holding the beverage, the boundaries of the interior volume defined generally by a cup bottom surface, a cup sidewall and a top surface, the top surface having a perimeter defined by the cup rim, the method comprising the steps of:*

*placing the cup adjacent an electrically conductive member,*

*dispensing beverage into the cup from a valve,*

*electrifying the beverage as it is dispensed into the cup,*

*sensing a current flow between the beverage and the conductive member during the dispensing of beverage into the cup, and the sensed current flow occurring wherein no portion of the conductive member extends into the volume of the cup and wherein no portion thereof extends transversely therefrom terminating adjacent to the cup top surface, and*

*stopping the flow of beverage from the valve to the cup when the sensed current flow exceeds a pre-determined value.*

*16. The method as defined in claim 15, and further including the steps of re-initiating the dispensing of the beverage into the cup after a first stopping of the flow of beverage from the valve to the cup,*

*sensing a current flow between the beverage and the conductive member during the re-initiated dispensing of beverage into the cup, and the sensed current flow occurring wherein no portion of the conductive member extends into the volume of the cup and wherein no portion thereof extends transversely therefrom terminating adjacent to the cup top surface, and*

*stopping the flow of beverage from the valve to the cup when the sensed current flow again exceeds the pre-determined value.*

*17. The dispenser as defined in claim 1, and said actuating means and electrically conductive member comprising an electrically conductive lever, and the lever pivotally secured and depending below the at least one valve means and having a substantially flat electrically conductive cup facing surface portion for contacting the cup when the cup is pressed against the lever.*

*18. The dispenser as defined in claim 13, and the lever pivotally suspended and depending below the at least one valve means and having a substantially flat electrically conductive cup facing surface for contacting the cup when the cup is pressed against the lever.*

*19. A beverage dispensing apparatus for filling a cup with a liquid beverage, the cup having a top rim and having an interior volume for holding the beverage, the boundaries of the interior volume defined generally by a cup bottom surface, a cup sidewall surface and a top surface, the top surface having a perimeter defined by the cup rim, the dispensing apparatus automatically filling the cup to a level substantially adjacent to the cup top surface, the beverage dispensing apparatus comprising:*

*a beverage dispensing valve connected to a source of beverage, and including a solenoid for opening and closing the valve,*

*switch means connected to an electrical power source and to the solenoid to pass power thereto for operating the solenoid,*

*a lever pivotally secured and depending below the valve, the lever for actuating the switch means by pressing of the cup to be filled against the lever, and the lever having a substantially flat electrically conductive surface portion along a length thereof for contacting the cup when the cup is pressed there against, and*

*electrical circuit means connected to the electrical power source for providing electrical current to the valve for electrically connecting the current source to the beverage as it flows from the source thereof through the valve and is dispensed into the cup, and the circuit including electrical control means, the control means connected to the conductive portion of the lever and to the solenoid for closing the valve and stopping dispensing of beverage into the cup when the control means senses a pre-established magnitude of current flow between the beverage and the lever conductive portion, and the conductive portion providing for such current flow wherein no conductive portion thereof extends into the volume of the cup and wherein no conductive portion thereof extends transversely from the lever terminating adjacent to the cup top surface.*

*20. A beverage dispenser as claimed in claim 19, and the control means further including means to re-initiate dispensing if the cup interior volume was not filled with the beverage to a desired level during a previous dispensing operation.*

* * * * *